Oct. 22, 1963
J. A. GAYLORD
3,107,370
ACTUATING DEVICES FOR AERIAL SURVIVAL KITS
Filed June 6, 1960
5 Sheets-Sheet 1
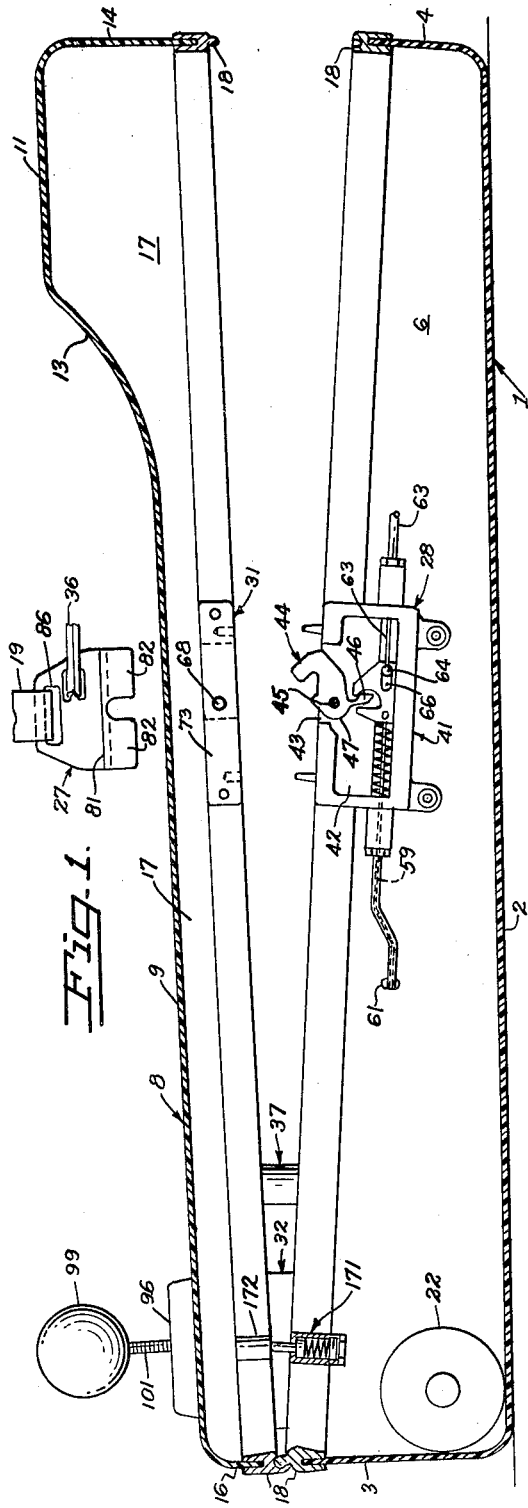
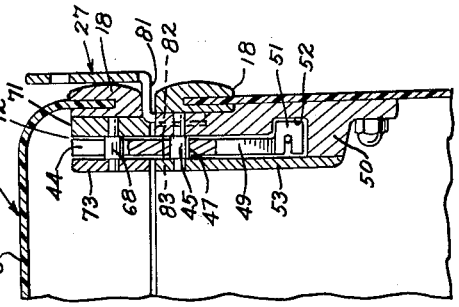
INVENTOR.
JOHN A. GAYLORD
BY George C. White
ATTORNEY

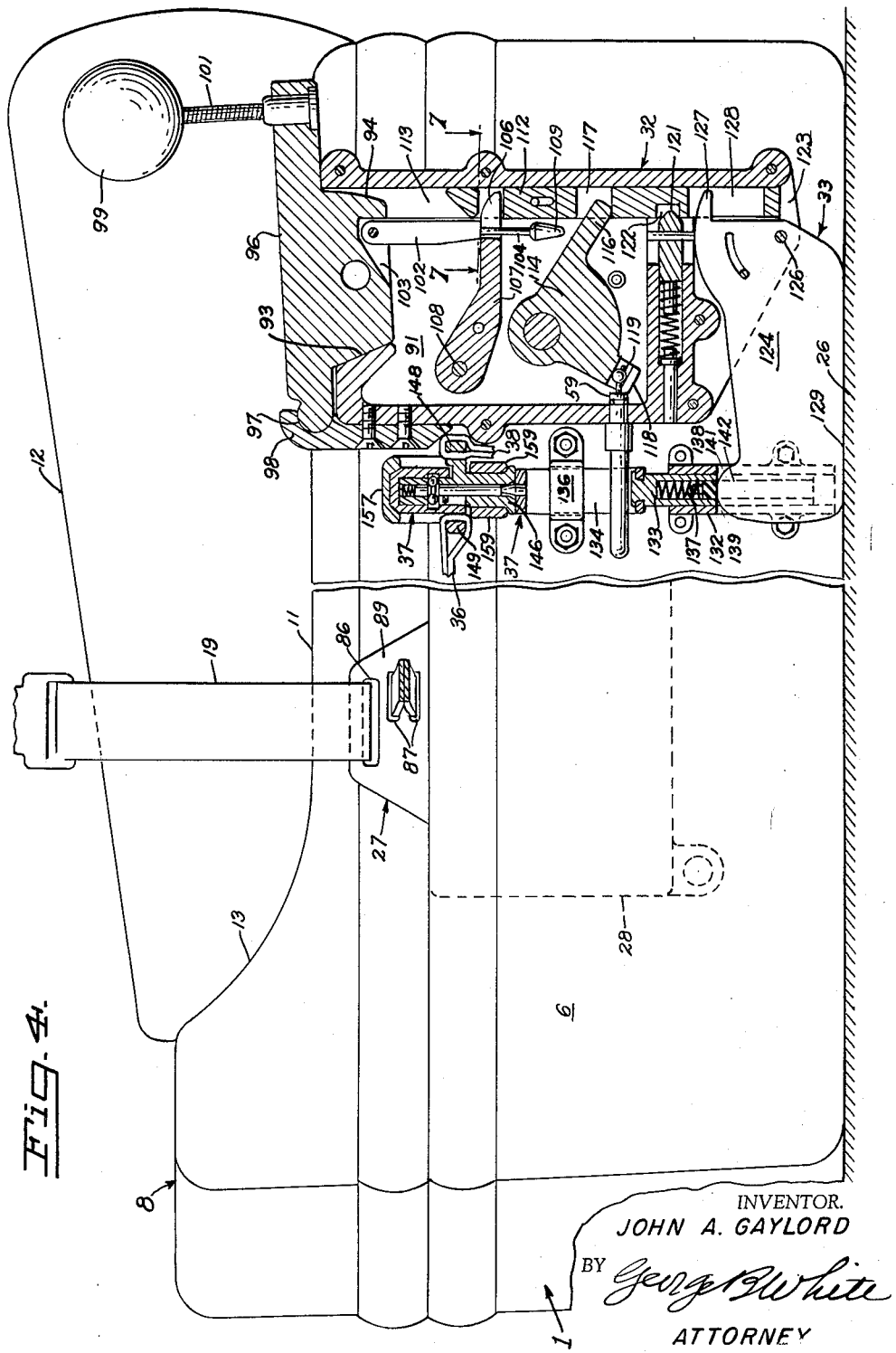

Oct. 22, 1963  J. A. GAYLORD  3,107,370
ACTUATING DEVICES FOR AERIAL SURVIVAL KITS
Filed June 6, 1960  5 Sheets-Sheet 3
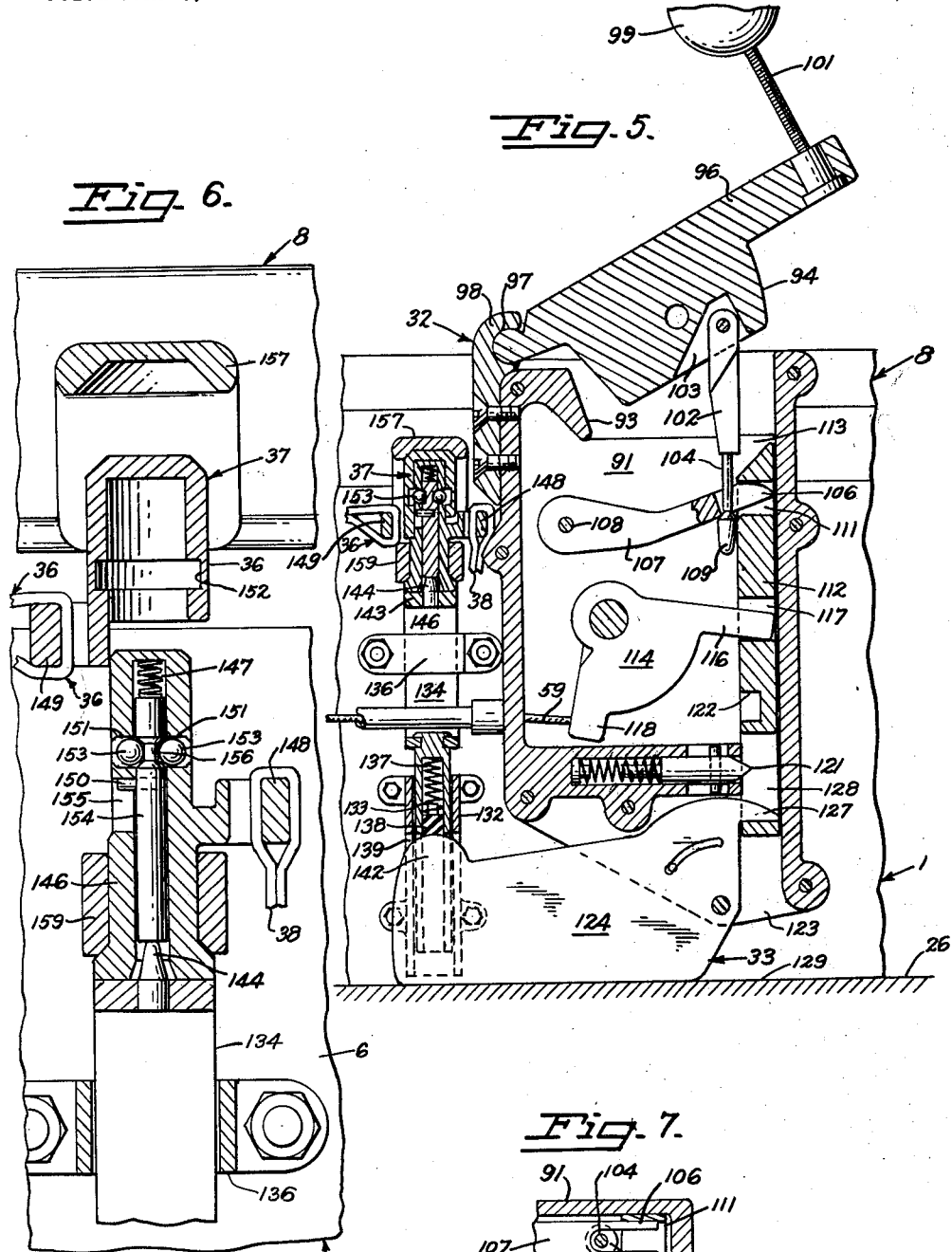
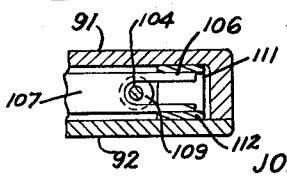
INVENTOR.
JOHN A. GAYLORD
BY George B White
ATTORNEY.

Oct. 22, 1963  J. A. GAYLORD  3,107,370
ACTUATING DEVICES FOR AERIAL SURVIVAL KITS
Filed June 6, 1960  5 Sheets-Sheet 4
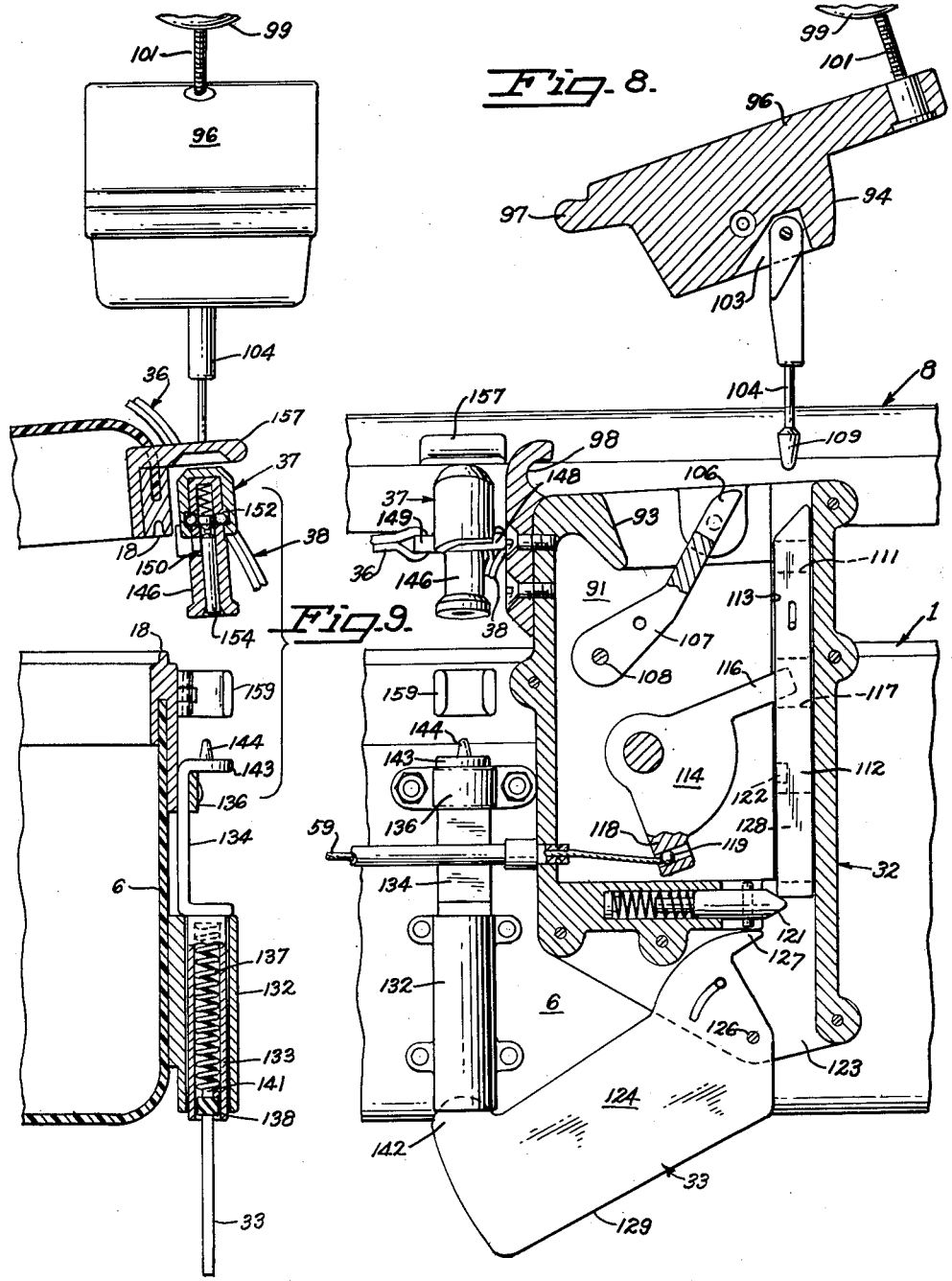
INVENTOR.
JOHN A. GAYLORD
BY George B White
ATTORNEY.

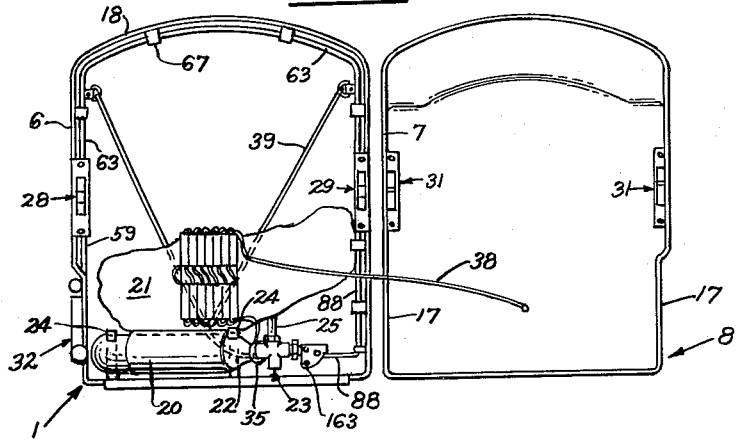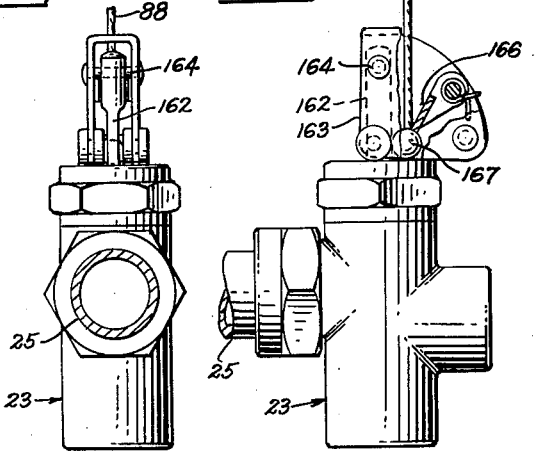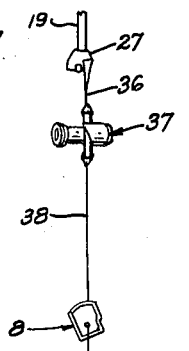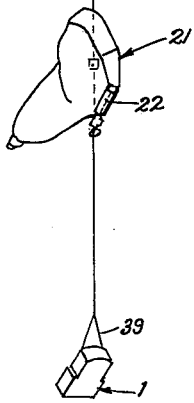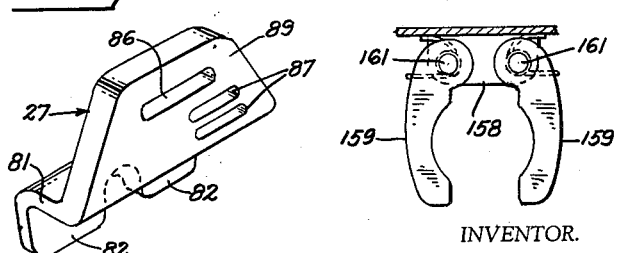

ated Oct. 22, 1963

3,107,370
ACTUATING DEVICES FOR AERIAL SURVIVAL KITS
John A. Gaylord, San Rafael, Calif., assignor to H. Koch & Sons, Corte Madera, Calif., a partnership
Filed June 6, 1960, Ser. No. 34,104
12 Claims. (Cl. 9—11)

This invention relates to actuating devices for aerial survival kits for flight personnel, and particularly of the type of survival kits which are adapted to be attached to the parachute harness of such personnel so that when upon ejection or escape from an airplane at high speed, the kit is in position to be released at a suitable time and be actuated quickly and efficiently so as to remove the lid of the same and simultaneously render the contents of the kit operable.

It is of utmost importance in aerial survival kits that simple and foolproof devices be provided for its manipulation and actuation so as to positively prevent any entangling of the kit with the parachute lines and positively render the kit operative in emergencies. Particularly in the type of kits herein involved where a casing is provided with a lid and where the emergency devices are contained in the kit it is essential that the lid releasing mechanisms be operated quickly and positively and that simultaneously the connections to the straps on which the kit hangs be released, yet the strap connections at other times be positively locked in position.

The primary object of the invention is to provide manipulating and locking devices for an aerial survival kit whereby the lid can be quickly and efficiently unlocked to permit the separation from the kit casing and to simultaneously release the strap connection on which the kit hangs from the parachute harness or the like.

A further object of the invention is to provide such simple and efficient mechanisms and devices for releasing the lid inside of the plane in emergency sufficiently to free the harness from the kit, and also to separate and release the components of the kit upon the ejection of the flight personnel from the aircraft and hang said components on a suspension lanyard; means being provided to prevent complete separation of the lid from the kit until such time that the kit is freed from the seat of the personnel.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a sectional view of the case of the kit with the lid partially raised and the strap connection disengaged.

FIG. 2 is a fragmental cross-sectional view of the locking device locking the lid to the case.

FIG. 3 is a fragmental sectional view of the case and partially sectional view of the locking device.

FIG. 4 is a fragmental view of the kit case showing in section the manipulating mechanism and releasable lanyard connection in engaged position.

FIG. 5 is a sectional view of the manipulating mechanism in partial releasing position.

FIG. 6 is a sectional view of the separated lanyard connection when the lid is partially raised.

FIG. 7 is a fragmental sectional view, the section being taken on the lines 7—7 of FIG. 4.

FIG. 8 is a sectional view of the manipulating mechanism completely released.

FIG. 9 is a fragmental sectional view of the lanyard connection when the lid is completely released from the case.

FIG. 10 is a top plan view of the case and lid open side by side.

FIG. 11 is a diagrammatic view illustrating the suspension of the parts of the kit during descent.

FIG. 12 is a partly sectional view of a gas valve for the $CO_2$ bottle.

FIG. 13 is a partly sectional side view of said gas valve showing the releasable pull line connection.

FIG. 14 is a perspective view of a strap connection, and

FIG. 15 is a partly sectional plan view of the spring clasp to hold the lanyard connector on the case.

The survival kit herein includes a rigid case 1 which has a bottom 2, a front wall 3, a rear wall 4 and perpendicular side walls 6 and 7. The top of the case is open and is adapted to be covered by a lid 8. The lid is formed with a top 9 and an elevated top wall 11 near the rear wall 4 of the case 1 forming a parachute rest while the aircraft personnel is seated upon the plain top 9. On the plain top 9 is usually provided a seat cushion 12. The elevated top 11 is connected to the plain top 9 by an upwardly extended curved connecting wall 13. The lid 8 has perpendicular walls, conforming to the perpendicular walls or sides of the case 1, namely a backwall 14, a front wall 16 and sidewalls 17. The meeting edges of the perpendicular walls of the lid 8 and of the case 1 are provided with suitable sealing strips 18 generally of tongue and groove construction. The coacting sealing strips 18 between the front walls 3 and 16 are of a pivotal type to allow the swinging of the lid upwardly about the meeting edges of the front walls 3 and 16 before complete disengagement. The case and the lid in the present illustration are constructed of a strong and rigid material, such as fiber reinforced plastic, in the present illustration of so called molded fiberglass.

Such a kit is connected usually to the parachute harness of the aircraft personnel in such a manner that when the aircraft personnel is ejected or escapes from the airplane in case of emergency, then the case and lid swing on suspending straps 19 suitably connected to the parachute harness. It is necessary in such aerial survival kits that after the parachute opens and the person reaches a suitable altitude, the lid be separated and some other suspension line be provided for suspending the components of the kit so as to expose certain emergency equipment in the case. Usually such case contains an inflatable raft 21 and a bottle of suitable inflating gas under compression such as bottle 22 containing $CO_2$ gas under compression controlled by a valve 23, as shown in FIGS. 10 and 11. It is also necessary that the valve 23 be opened after the lid 8 is separated from the case 1 and the life raft 21 is pulled out of the case 1 and inflated so that by the time the person reaches a body of water beneath him, the raft 21 is ready for use. This $CO_2$ bottle 22 is supported on suitable brackets 24 in the case 1 and is connected by a suitable conduit 25 to the intake of the raft 21. This bottle 22 is suitably fixed in a pocket 20 of the raft 21.

While the case 1 still rests upon the seat 26 beneath the aircraft personnel, and if the person must leave his seat 26, he detaches the hanging strips 19 from his parachute harness by opening the usual clasp well known in the art and therefore not herein shown. In the event of any emergency in the plane, such as fire or explosion when there may not be time for disengaging the straps from the parachute harness and if the plane is not abandoned, means must be provided for such person to quickly lift the lid just sufficiently to permit the disengaging of the hanging straps 19 from the kit without completely separating the lid 8 from the case 1, and without actuating the inflating valve 23.

Accordingly in the herein invention there are provided opposite strap connections 27 adapted to be held in place by the lid 8. The lid 8, in turn, is held in place by opposite locking devices 28 and 29 on the respective perpendicular sidewalls 6 and 7 of the case 1, coacting with suitable keeper devices 31 in the adjacent sidewalls 17 of the lid 8. The locking devices 28 and 29 are connected to each other for simultaneous operation when one of said locking devices is operated. The locking device 28 on one side is actuated by a manipulating device 32 which is controlled through a restrictor device 33 so as to allow only partial manipulation for freeing the strap connections 27 only while the case 1 and the restrictor device 33 rest upon the seat 26, but to permit complete operation and separation of the lid 8 when the restrictor device 33 is freed from said seat 26.

A connecting lanyard 36 extends from the strap connection 27 of the locking device 28 nearer to the restrictor device 33 to a separable lanyard connection 37 at the manipulating device 32 so arranged that upon partial operation of the manipulating device 32 solely for releasing the strap connection 27, this connecting lanyard 36 and the separable lanyard connection 37 are freed to permit the person to leave his kit on the seat 26. Means being provided to lock this separable lanyard connection 37 to an actuating lanyard 38 which actuating lanyard 38 extends through the lid 8 and is formed with a loop 35 tied around the bottle 22 so as to support the bottle 22 and the raft 21, and then extends to a suitable suspension harness 39 fastened in the case 1, so that when freed from the aircraft the case 1, the raft 21 and the lid 8 hang on the actuating lanyard 38 in spaced series. The actuating lanyard 38 is suspended on the lanyard connection 37 from the connecting lanyard 36 and from the strap 19 of the parachute harness, as shown in FIG. 11.

The locking devices 28 and 29 are on the inner faces of the respective sidewalls 6 and 7. Each locking device includes a base 41 which has a recess 42 therein. A slot 43 is provided in the top of the base 41 to accommodate a pivoted hook 44. The pivot 45 of the hook 44 extends transversely of the base 41. A finger 46 is extended from hook hub 47 generally downwardly toward the lower edge of the vertical base 41. The finger 46 has converging edges 48 at suitable angles for engagement with a cam 49 slidable on the lower horizontal side 50 of the recess 42. A side flange 51 on the base of the cam 49 slides in a guide slot 52 to guide the cam 49 along said lower horizontal side 50. A cover plate 53 is fastened, preferably by suitable screws, over the base 41 so as to cover the recess 42 and hold the sliding cam 49 in place.

The cam 49 has an open cavity 54 extended from its upper edge inwardly between a pair of fingers 56 and 57. The leading finger 56 engages the hook finger 46 so as to hold the hook 44 positively in locking position as shown in FIG. 3. As the cam 49 is pulled so as to pull the leading finger 56 from under the hook finger 46, it allows the hook finger 46 to drop into the cavity 54, then the curved concave edge 58 of the follower cam finger 57 engages the hook finger 46 and pushes it into unlocking position as shown in FIG. 1. By further advancing or pulling and sliding the cam 49 in the direction of the leading finger 56 the hook 44 can be turned to a fully open position withdrawn into the slot 43 of the base 41.

There is suitably attached to the cam 49 below the leading finger 56 a pull line 59 which latter extends through a hole 61 of a perpendicular side of the case 1 and is connected to another device for exerting a pull on the cam 49 against the action of a coil spring 62 around the line 59 between said perpendicular side wall of the recess 42 and the leading edge of the cam 49 so as to normally urge the cam 49 into the locking position shown in FIG. 3.

Another pull line 63 is connected by a suitable ball connection 64 into an elongated slot 66 in the base of the cam 49. The relation between this second pull line 63 and the elongated slot 66 is such in the locking device 28 on the sidewall 6 that the cam 49 will pull the second pull line 63 without any slack simultaneously with the pull exerted upon the cam 49. This second pull line 63 extends through suitable guides 67, as shown on FIG. 10, around the inside of the casing walls to the other locking device 29 on the inside face of the opposite sidewall 7 of the case 1, and is there connected to the leading edge of the cam 49 of the locking device 29 to transmit a pull simultaneously with and in the same manner as the pull line 59 of the first locking device 29. In this manner by pulling the first pull line 59 both locking devices 28 and 29 can be simultaneously and instantaneously unlocked sufficiently to unhook the respective hooks 44 from the respective keeper bolts 68 of the lid 8 and thereby permit the raising of the lid 8 from the case 1.

On the inside face of each sidewall 17 of the lid 8 is provided a base 71 with a recess 72 therein covered by a cover plate 73 and open downwardly in registry with the respective hook slots 43 of the respective locking devices 28 and 29 so that the hooks 44 can extend into the respective keeper recesses 72. Each keeper bolt 68 extends transversely across its base 71 and cover plate 73 so as to be engaged by the adjacent hook 44 for locking the lid 8 to the case 1.

A pair of aligning pins 74 extend from the top of each locking device base 41 into corresponding locating holes 76 in the adjacent keeper base 71 to properly align the lid 8 with the top of the case 1.

Each strap connection 27 includes a base flange 81, adapted to rest upon the top of the adjacent sealing strip 18 on the edge of the case 1. From an edge of the base flange 81 extend a pair of legs 82 which fit into pockets 83 formed in the adjacent locking device base 41 next to the said sealing strip 18 and on the opposite sides of the end of the hook pivot 46. The corresponding portion of the sealing strip 18 on the edge of the lid 8 and the adjacent portion of the base 71 under the keeper bolt 68 is cut away or recessed to fit over and accommodate tightly the base flange 81. A perpendicular plate 89 extends from the outer edge of the base flange 81 and alongside the lid 8 and has a slot 86 near the top thereof into which the strap 19 is suitably fastened. Below the slot 86 of the plate 89 there are a pair of shorter slots 87 through which the connecting lanyard 36 is fastened. Hence when the lid 8 is locked to the case 1, the strap connection 27 is held tightly in position. When the lid 8 is lifted sufficiently, then the strap connection 27 can be pulled out of the pocket 83 and thus the strap 27 can be freed from the case 1.

From the locking device 29 on the case side 7 extends a third pull line 88 which is connected into the elongated slot 66 of the cam 49 of this locking device 29 by the same kind of ball connection 64 as heretofore described, but the initial position of the ball connection 64 in the second locking device 29 is so adjusted that the ball connection 64 is at the leading end of the elongated slot 66 nearer to the leading finger 56 of the cam 49. This third pull line 88 extends around the inside walls of the case 1 through suitable guides to the usual valve 23 of the $CO_2$ bottle 22 to turn the valve 23 when the third pull line 88 is pulled. The connection of this third pull line 88 to the valve 23 is separable after the valve 23 is actuated. By reason of the slack in the elongated slot 66 the cam 49 of the locking device 29 can be pulled sufficiently to a distance equal to the length of the slot 66 to release the hook 44 from the keeper bolt 68 and permit the raising of the lid 8 from the case 1 without pulling the third pull line 88 and without operating the inflating valve 23. Thus the removal of the strap connections 27 can be achieved in an emergency within the aircraft without inflating the raft 21, by exerting a pull on the first pull line 59 only equal to the elongated slot 66. By exerting further pull on the pull line 59 to the extent of withdrawing the hook 44 into the slot recess 43, the third pull line 88 is pulled for turning the inflating valve 23 of the $CO_2$ bottle 22 for inflating the raft 21. As hereinafter described, such further pull is positively restricted while the kit is resting on the seat and can be accomplished only after the ejection or escape of the aircraft personnel from the craft, and after the freeing of the kit from the seat 26. The restrictor device 33 is coacting with the manipulating device 32 to positively limit the operation of the manipulating device only to the release of the locking devices 28 and 29 as long as the kit is resting on the seat 26.

The manipulating device 32, in this illustration, is on the outside of the kit and includes a recessed or hollow base 91 fixed on the case 1, and covered by a plate 92 which latter is suitably secured such as by screws over the base 91. The top of the hollow base 91 has therein a partly frusto-conical socket 93 into which fits a plug extension 94 of a handle or actuating lever 96. The actuating lever 96 has a semi-cylindrical edge 97 journalled in a correspondingly semi-cylindrical journal 98 on the top of the hollow base 91 so that after the handle or actuating lever 96 is pulled entirely clear of the socket 93, the entire lever 96 is freed or disengaged completely from the kit. For the purpose of manipulating this actuating lever 96, any suitable handle may be extended from the top of the lever 96. For purpose of illustration herein, a handle ball 99 on a spring stem 101 extends upwardly. The bottom of the spring stem 101 is suitably fixed near the free end or edge of the lever 96.

From the flat plug extension 94 extends inwardly a link 102 pivoted in a recess 103 in the bottom of the flat plug extension 94 so as to hang from said plug extension 94 inwardly of the recess of the hollow base 91. A reduced portion or neck 104 of the link 102 extends between yoke fingers 106 of a lever 107 pivoted at one end 108 in said hollow base so that the enlarged button 109 of the lower end of the neck 104 is spaced normally below the yoke fingers 106 but when pulled upwardly engages the yoke fingers 106 so as to turn the pivoted lever 107 in said recess. The tips of the yoke fingers 106 extend into a hole 111 in a vertically sliding bolt 112. The bolt 112 slides in a guide channel 113 along a vertical side of the recess in the hollow base 91.

A bell crank lever 114 is also pivoted on an axis parallel with and below the pivot of the lever 107 in said hollow base 91 and has one arm 116 thereof extended into another hole 117 of said bolt 112 so that as the bolt 112 is pulled by the upper lever 107 it turns the bellcrank 114. To the other arm 118 of the bellcrank 114 is suitably connected by a ball and socket connection 119 the first pull line 59 heretofore described. Thus the locking devices 28 and 29 are actuated by pulling up the actuating lever 96 and thereby pulling up the bolt 112 to turn the bellcrank 114. The upward motion of the bolt 112 is restricted to a limited stroke by the restrictor device 33 as long as the kit is rested on the seat 26.

In order to prevent accidental movement of the bolt 112 a spring pressed detent 121 suitably mounted in the bottom of the base 91 projects into a notch 122 on one side of the bolt 112. The detent 121 has a tapered tip thereon engaging the respective corners of the notch 122 so that it may be pushed out of the way when pulling force is exerted on the bolt 112. In order to assure the alignment of the various holes and notches of the bolt 112, said bolt 112 and channel 113 are of rectangular cross-section.

From the bottom of the hollow base 91 of the manipulating device extends downwardly a bracket 123. The restrictor device 33 includes a flat lever 124 pivoted on a pivot 126 on said bracket 123. The pivot 126 is parallel with the pivots of the bell crank 114 and of the lever 107. On the top corner of the flat lever 124 is a prong 127 which extends into an elongated slot 128 in the lower end of the bolt 112 which latter projects below the recess of said hollow base 91. The lower or base edge 129 of the flat lever 124 is flush with the bottom 2 of the case 1 when the case rests upon the seat 26 as shown in FIGS. 4 and 5, and in this position the prong 127 is within the elongated slot 128 and restricts the stroke of the bolt 112 upwardly to the length of the elongated slot 128 which length generally corresponds to the desired stroke of movement of the cams 49 and to the length of the elongated slot 66 in said cams 49.

When the kit is freed from the seat 26 the restrictor lever 124 drops downwardly and the prong 127 is withdrawn from the elongated slot 128 of the bolt 112 so as to clear the same and permits the upward movement of the bolt 112 to its full extent, thereby to permit the pulling of the cams 49 beyond the length of the elongated slot 66 for the actuation of the inflating valve 23.

Next to the tail of the restrictor lever 124 and spaced from but along the manipulating device 32 and on the outside of the case 1 is the lanyard connector device 37 which is controlled by said restrictor lever 124 so that when the restrictor lever is in restricting position, then the connect or lanyard 36 can be removed with the strap 19. When the restrictor lever 124 is in bolt clearing position, namely when it is freed from the seat 26, then the lanyard 36 is connected to the lanyard connector device 37 so that the freed case can hang on the lanyard 36 from the respective strap 19.

This selective lanyard connector device 37 includes a sleeve 132 which is suitably mounted on the sidewall 6 of the case 1 between the manipuating device 32 and the adjacent locking device 28. The sleeve 132 is located nearer to the bottom of the case 1. In the sleeve 132 is slidable a tubular plunger 133 to the head of which is connected a generally U-shaped connecting bar 134 so that the middle portion of the connecting bar 134 is alongside the side 6 of the case 1 and is guided in a suitable guide 136 on the case 1. A coil spring 137 is positioned inside the tubular plunger 133 and bears against the head thereof. Below the coil spring 137 is a compressible Teflon cushion 138. The sleeve 132 and the plunger 133 have aligned slots 139 and 141 respectively into which extends the flat tail of the restrictor lever 124. On this tail of the restrictor lever 124 is a cam projection 142 which bears against the Teflon cushion 138 so that when the flat lever 124 rests upon the seat 26, then upward pressure is exerted by the cam projection 142 which holds the coil spring 137 compressed. In the upper leg 143 of the U-shaped bar 134 is secured a pin 144. On the top of the upper leg 143 of the U-shaped bracket 134 rests a removable tubular sleeve 146 into which the pin 144 projects. The top of the removable tubular sleeve 146 is closed and has a coil spring 147 therein which is weaker than the coil spring 137 in the plunger 133. On one side of the removable tubular sleeve is provided a loop 148 into which is secured the end of the actuating lanyard 38. This loop 148 is located approximately midway between the ends of the removable tubular sleeve 146.

Over the closed upper portion of the removable tubular sleeve 146 is positioned a cap which forms the separable lanyard connector 37. This cap or separable connector 37 has a loop 149 thereon to which the connecting lanyard 36 from the strap connection 27 is connected. The removable tubular sleeve 146 has opposite holes 151 through its sides surrounded by the separable connection cap 37 which latter has an annular socket 152 therein in registry with the holes 151. The depth of the socket 152 is such that when balls 153 are forced into the socket 152 the balls 153 are partially in the holes 151 and thereby interlock the separable connector 37 with the removable tubular sleeve 146. Inside the removable tubular sleeve 146 is a slidable bar 154 with a reduced neck 156 in alignment with the balls 153 whenever the pin 144 presses the bar 154 upwardly against the action of the top weaker coil spring 147. In this position the lanyard connector cap 37 is removable from the tubular sleeve 146.

This is the position whenever the restrictor lever 124 is resting on the seat 26 and is held in the position shown in FIG. 5. Whenever the kit is freed from the seat 26 the coil spring 137 pushes the flat lever 124 outwardly of the lower sleeve 132 and as the flat lever 124 drops away, the upper coil spring 147 is permitted to force the bar 154, the pin 144, the U-shaped bar 134 and the plunger 133 downwardly so as to push the reduced neck 156 of the bar 154 past the balls 153 and thus cause the upper portion of the bar 154 to push the balls 153 out into the socket 152 of the removable connection 37. A limit pin 150 extends from the bar 154 and slides in a limit slot 155 so that when the limit pin 150 is at the top of the slot 155, then the reduced neck 156 is aligned with the balls 153, and when the limit pin 150 is at the lower end of the slot 155, then the upper portion of the bar 154 above the reduced neck 156 is pressing the balls 153 outwardly. Thus the bar 154 is maintained in locking position. If the manipulating device 32 is manipulated while the kit rests on the seat 26, then only the locking devices 28 and 29 are released sufficiently to permit the partial raising of the lid 8 and permit the withdrawal of the strap connections 27 so that the person can leave the kit on the seat 26. Under such conditions the separable lanyard connection cap 37 is also pulled up and removed. When the person is ejected or escapes from the plane and the flat restrictor lever 124 is freed, so as to free the manipulating device as well as lock together both lanyard connections, then upon manipulation of the manipulating device 32 the lid 8 is completely separated, the strap connections 27 are withdrawn but the separable connection 37 and the upper removable sleeve 146 being locked together, the actuating lanyard 38 pulls the inflatable raft 21 out of the case 1 and the separated components of the kit hang in series from the strap 19, as shown in FIG. 11. As heretofore described, upon such pull actuation, the third pull-line 88 is also pulled so as to open the inflating valve 23 so that the raft is inflated while in the air.

In order to prevent accidental freeing of the separable lanyard connection 37, a detent bracket 157 extends from the top of the sealing strip 18 of the lid 8 over the top of the connection cap 37. Thus the connection cap 37 is held in position until the lid 8 is lifted or separated sufficiently to raise the detent bracket 157 out of the way of the cap 37. The upper removable sleeve 146 is normally held on the case 1 by a suitable spring clip of such strength that the removable sleeve 146 can be pulled out of the spring clip by the force exerted by the connecting lanyard 36 when the components of the kit are separated in the air. This spring clip includes a base 158 mounted on the case 1 and a pair of curved arms 159 embracing the sleeve 146 and held on the base 158 by suitable spring pivots 161 biased to urge the arms 159 toward one another and against the sleeve 146.

In FIGS. 12 and 13, the connection of the pull line 88 to the $CO_2$ valve 23 is illustrated so that the pull line 88 is freed from the valve 23 after the valve is opened. The valve stem 162 is kept in valve closing position by a cam 163 swingable on a pivot 164 in the end of the valve stem 162. On the cam 163 is a spring pressed catch 166 so spaced from the stem 162 as to prevent escape of a ball 167 on the end of the pull line 88, which latter extends along the stem 162. As the pull line 88 is pulled, the ball 167 bears against the catch 166 and swings cam 163 off the top of the valve body thus frees the stem 162 and permits the interior valve spring (not shown) to pull the valve into open position. The ball 167 then is free to escape from the cam 163.

When the handle 99 of the manipulating device 32 is pulled up and the locking devices 28 and 29 are released, positive opening of the lid is assured by means of a spring loaded plunger 171 mounted on the inside of the case 1 and bearing against a striker block 172 mounted in the lid 8 in proper registry to receive and transmit the lifting force of the plunger 171 for lifting the released lid 8, as shown in FIG. 1.

I claim:

1. In an aerial survival kit for flight personnel, a rigid case, an inflatable raft packed in the rigid case, a rigid lid on the case, coacting locking means on the case and on the lid for locking the lid to said case, manipulating means on the case for releasing said locking means at will, a container for the inflating medium in the case, valve means to control communication from said container to said raft, means to connect said manipulating means to said valve means to actuate said valve means when said locking means are released, a suspension lanyard extended through said lid and connected to said raft so as to suspend said raft spaced from said lid, a suspension lanyard connection between said raft and said case to suspend said case spaced below said raft when said locking means are released, and strap connecting means connecting said first mentioned lanyard to hanging straps on said personnel so that when said locking means are released said first mentioned lanyard hangs from said straps and suspends said raft spaced from said personnel and said raft is suspended free of said case; said inflating medium container being secured to and freed with said raft.

2. In an aerial survival kit for flight personnel, a case containing a life saving device, a lid on the case, coacting locking means on the case and on the lid for locking the lid to said case, a suspension lanyard extended through said lid and connected to said life saving device and then to said case for suspending said lid, said device and said case in series when released, strap connecting means clamped between the case and the lid for connecting hanging straps of said flight personnel to the kit, means to connect said strap connecting means to said suspension lanyard so that when said strap connecting means is released from said lid and said case is freed then said lanyard hangs on said hanging strap and suspends said lid, said life saving device and said case in spaced relation, and manipulating means on the case for releasing said lid locking means at will, said life saving device being an inflatable raft, a container for inflating medium in said case connected to and carried by said raft, a normally closed valve to control introduction of said medium from said container into said raft, and a valve actuating device co-related with said locking means to open said valve for inflating said raft when said locking means are unlocked by said manipulating means for the freeing of said lid from said case, said valve actuating device being separable so as to permit said container to be freed with said raft from said case.

3. In an aerial survival kit for flight personnel, a case containing a life saving device, a lid on the case, coacting locking means on the case and on the lid for locking the lid to said case, a suspension lanyard extended through said lid and connected to said life saving device and then to said case for suspending said lid, said device and said case in series when released, strap connecting means clamped between the case and the lid for connecting hanging straps of said flight personnel to the kit, means to connect said strap connecting means to said suspension lanyard so that when said strap connecting means is released from said lid and said case is freed then said lanyard hangs on said hanging strap and suspends said lid, said life saving device and said case in spaced relation, and manipulating means on the case for releasing said lid locking means at will, said life saving device being an inflatable raft, a container for inflating medium in said case connected to said raft, a normally closed valve to control introduction of said medium from said container into said raft, a valve actuating device connected for manipulation in series with said locking means and operated through said locking means when said locking means are unlocked beyond a predetermined lid releasing position, and restraining means normally to limit said manipulating device to operate only to said predetermined lid releasing position of said locking means, said restraining means freeing said manipulating means for further manipulation when said case is freed from the aircraft.

4. The invention defined in claim 3 and a spring pressed device to urge said lid away from said case when said locking means are released.

5. In an aerial survival kit for flight personnel, a rigid case, an inflatable lift raft in said case, a container in said case for an inflating medium connected to and carried by said lift raft, a normally closed valve device to control flow of said medium from said container to said raft, a rigid lid to cover said case, releasable locking means to lock said lid and case together, manipulating means to release said locking means, means of connection between said manipulating means and said valve to open said control valve when manipulating through said manipulating means, and means to suspend said case and said raft spaced from each other and from said flight personnel when said locking means are released, said means of connection being separable after the valve is opened to free said container with said raft for inflation after said freeing and during suspension.

6. The combination defined in claim 5, said manipulating means including a handle actuated pulling mechanism, a pull line connecting said pulling mechanism to said lid locking means so as to release said lid locking means when pulled by said pulling mechanism, a second pull line connecting said locking means to said valve so as to open said valve after said locking means is released and said means of connection being between said second pull line and said valve and being separable after said valve is opened to free said valve and container from the case.

7. The combination defined in claim 6 and a device interconnected between said locking means and said second pull line so as to render said second pull line inoperative while said kit rests on the seat and to render said second pull line operative when said kit is freed from the seat.

8. In an aerial survival kit for flight personnel, a rigid case containing survival aids, held therein, a rigid lid on said case adapted to form a seat, releasable locking means to interlock said case and lid, suspension strap connector held by the lid on said case and being releasable when said lid is released by said locking means, manipulating means to release said locking means, suspension connection means on the case, a suspension element on said suspension connection means, a connecting member connecting said suspension element and said strap connector, releasable means to secure said suspension element on said suspension connection means, a device to release said releasable securing means when said kit rests on a seat to permit removal of said connector from the kit and to secure said releasable means when said kit is freed from the seat so as to suspend said case from said strap connector and suspension means, and manipulating means on the case for releasing said lid locking means at will.

9. The combination defined in claim 8, said survival aids including an inflatable raft, means to secure said raft to said case for suspension together with said case, a container for a raft inflating medium in said case connected to said raft, a normally closed valve to control the introduction of said inflating medium into said raft, and means correlated with said manipulating means and with said locking means to open said valve after the releasing of said lid locking means and after a predetermined stroke of movement of said manipulating means.

10. The combination defined in claim 9, and releasable means actuated by said releasing device to limit the stroke of movement of said manipulating means to the releasing of said locking means until after said kit is freed from said seat.

11. The combination defined in claim 9, and releasable means actuated by said releasing device to limit the stroke of movement of said manipulating means to the releasing of said locking means until after said kit is freed from said seat, and means to hold said suspension means on said case being releasable by the pull exerted on said suspension means when said kit is freed from said seat and is suspended from said strap connector.

12. The combination defined in claim 9, and releasable means actuated by said releasing device to limit the stroke of movement of said manipulating means to the releasing of said locking means until after said kit is freed from said seat, and means to hold said suspension means on said case being releasable by the pull exerted on said suspension means when said kit is freed from said seat and is suspended from said strap connector, and a lanyard connected from said suspension element to said raft and then to said case to suspend said raft and case in spaced relation from said strap connector.

References Cited in the file of this patent

UNITED STATES PATENTS

| | | |
|---|---|---|
| 2,095,974 | Finch | Oct. 19, 1937 |
| 2,467,037 | Kajdan | Apr. 12, 1949 |
| 2,609,549 | Krupp | Sept. 9, 1952 |
| 2,803,368 | Koch | Aug. 20, 1957 |
| 2,939,603 | Young | June 7, 1960 |
| 2,992,798 | Smith et al. | July 18, 1961 |